United States Patent
Abbas et al.

(10) Patent No.: US 7,833,994 B2
(45) Date of Patent: Nov. 16, 2010

(54) ETHANOL EXTRACTION OF PHYTOSTEROLS FROM CORN FIBER

(75) Inventors: Charles Abbas, Champaign, IL (US);
Kyle E. Beery, Decatur, IL (US);
Thomas P. Binder, Decatur, IL (US);
Anne M. Rammelsberg, Decatur, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 496 days.

(21) Appl. No.: 11/084,933

(22) Filed: Mar. 21, 2005

(65) Prior Publication Data

US 2005/0220951 A1    Oct. 6, 2005

Related U.S. Application Data

(60) Provisional application No. 60/555,284, filed on Mar. 22, 2004.

(51) Int. Cl.
*A61K 31/56* (2006.01)
*A61K 31/575* (2006.01)

(52) U.S. Cl. .................. 514/170; 514/169; 514/54; 514/57; 514/60; 536/5; 424/750; 426/482

(58) Field of Classification Search ............... 514/170, 514/169, 54, 57, 60; 536/5; 424/750; 426/482
See application file for complete search history.

(56) References Cited

U.S. PATENT DOCUMENTS 5,776,535 A * 7/1998 Palardy .................. 426/618
5,843,499 A   12/1998 Moreau
2001/0020091 A1 * 9/2001 Buchanan et al. .......... 536/123
2003/0235633 A1 * 12/2003 Abbas et al. .............. 424/750

FOREIGN PATENT DOCUMENTS

WO    00/47701 A2    8/2000

OTHER PUBLICATIONS

Singh et al. (Cereal Chemistry (2003), 80 (2), 118-122) (Abstract Sent).*
Supplementary European Search Report dated July 10, 2009.
Moreau et al. "Phytosterols in the Aleurone Layer of Corn Kernals", Biochemical Society Transactions, vol. 28, No. 6, Dec. 2000, pp. 803-806.

* cited by examiner

*Primary Examiner*—Shaojia Anna Jiang
*Assistant Examiner*—Michael C Henry
(74) *Attorney, Agent, or Firm*—Craig G. Cochenour; Duane A. Stewart, III; Buchanan Ingersoll & Rooney PC

(57) ABSTRACT

The present invention provides a process for extracting sterols from a high solids, thermochemically hydrolyzed corn fiber using ethanol as the extractant. The process includes obtaining a corn fiber slurry having a moisture content from about 20 weight percent to about 50 weight percent solids (high solids content), thermochemically processing the corn fiber slurry having high solids content of 20 to 50% to produce a hydrolyzed corn fiber slurry, dewatering the hydrolyzed corn fiber slurry to achieve a residual corn fiber having a moisture content from about 30 to 80 weight percent solids, washing the residual corn fiber, dewatering the washed, hydrolyzed corn fiber slurry to achieve a residual corn fiber having a moisture content from about 30 to 80 weight percent solids, and extracting the residual corn fiber with ethanol and separating at least one sterol.

13 Claims, No Drawings

ETHANOL EXTRACTION OF PHYTOSTEROLS FROM CORN FIBER

CROSS-REFERENCE TO RELATED APPLICATIONS

This application is a nonprovisional of and claims the benefit of priority to U.S. Provisional Patent Application Ser. No. 60/555,284, filed on Mar. 22, 2004, entitled "Ethanol Extraction Of Phytosterols From Corn Fiber" having the same named applicants as inventors, namely, Charles Abbas, Kyle E. Beery, Thomas P. Binder, and Anne M. Rammelsberg. The entire contents of U.S. Provisional Patent Application Ser. No. 60/555,284 is incorporated by reference into this nonprovisional utility patent application.

STATEMENT OF FEDERALLY SPONSORED RESEARCH

The U.S. Government has a paid-up license in this invention and the right in limited circumstances to require the patent owner to license others on reasonable terms as provided for by the terms of Award Number 04-03-CA-7060 awarded by U.S. DOE (Department of Energy).

BACKGROUND OF THE INVENTION

1. Field of the Invention

This invention relates to a method of ethanol extraction of corn fiber that has been thermochemically treated.

2. Description of the Background Art

"Wet-milling" is a process by which corn can be converted into ethanol, corn sweeteners, and starches. As used herein, "corn fiber" is defined as "the product obtained from the wet-milling process, which involves an initial steeping of corn kernels in aqueous sulfur dioxide at an elevated temperature followed by gentle grinding and physical separation of the outer fiber layers from starch, protein and other components."

Corn fiber is produced by corn wet-milling at the rate of 13% per bushel of corn processed. More than 15,000 tons of corn fiber are produced per day at wet-mills according to the Corn Refiners Association. Along with the corn fiber, portions of the protein, oil, and starch from corn are separated with the fiber stream, and, with corn steep liquor and stillage that are sprayed on the fiber along with corn germ meal, which is mixed into the stream, a total of about 25% of the corn processed becomes part of the corn gluten feed stream. Corn steep liquor is the liquid that is derived from the initial steeping of the corn kernels, and stillage is the bottoms from the distillation of the ethanol fermentation broth, comprising mainly water, non-volatiles, and solids derived primarily from yeast cell mass. The corn steep liquor and stillage provide nutrients and protein to the corn gluten feed, which is a low value by-product stream that is sold as animal feed. In the present invention, a cost effective method is provided that upgrades the corn fiber stream into more valuable and usable components.

Corn fiber is composed of approximately 15-25% starch, 10-13% protein, 33-42% hemicellulose, 15-18% cellulose, 3-6% ash, 3-6% oil, and 1-2% other components. The hemicellulose is composed of 50-55% xylose, 30-35% arabinose, 4-6% galactose, 3-5% D-glucuronic acid and 2-5% other components including mannose, coumaric acid, and ferulic acid. The corn fiber stream at the plant coming from the dewatering presses contains 30-50% solids. During thermochemical treatment of the corn fiber, the fiber is heated to 130-180° Centigrade (C.), which solubilizes the starch and hemicellulose fractions, while leaving the cellulose intact. Starch is composed of two types of glucose polymers, amylose and amylopectin. Amylose is a linear polymer with the glucose molecules linked by $\alpha$-1,4-glycosidic bonds, and amylopectin is a highly branched polymer with the glucose molecules linked by $\alpha$-1,4-glycosidic bonds with $\alpha$-1,6 linked branches. Hemicellulose in corn fiber is composed of a $\beta$-1,4 linked xylose backbone with side-chains composed of arabinose, xylose, galactose, glucuronic acid, mannose, ferulic acid, and coumaric acid. The starch can be removed from the fiber by hydrolysis with a combination of heat and either starch-degrading enzymes or sulfuric acid. Under these conditions, the starch polymer is hydrolyzed first to soluble oligosaccharides, which can be further hydrolyzed to glucose by a secondary acid or enzyme hydrolysis step. The hemicellulose can be partially hydrolyzed by treating the corn fiber at temperatures above 121° C., but the complete hydrolysis of the xylan backbone to monomers requires further treatment with acid or enzymes.

The hydrolysis of the starch and the hemicellulose can also be combined into a single step. The native corn fiber, containing residual sulfur dioxide from the steeping process, can be treated at high temperatures with the optional addition of acid. This treatment will cause simultaneous hydrolysis of the starch and the hemicellulose.

The monosaccharides from the hydrolyzed starch and hemicellulose can be used in many different industrial applications including fermentations and catalytic conversion to sugar alcohols and subsequently polyols. The glucose from the starch can be used in a yeast fermentation to produce ethanol, or can be fermented to other products. The xylose can also be similarly fermented to a number of fermentation-derived products known by those persons skilled in the art. The ferulic acid can be used as a feedstock for the production of vanillin.

The remaining corn fiber after the hydrolysis step can then be contacted with a solvent to extract the oil present. For example, U.S. Pat. No. 5,843,499 (Moreau at al.) discloses that the oil fraction, which contains phytosterols, can be extracted from corn fiber using hexane in the presence of the antioxidant, BHT. The process described in Moreau et al. was completed on dried, ground corn fiber at room temperature with agitation. The extraction set forth in Moreau et al. resulted in mixed oils containing triglycerides (TAG), fatty acid esters of phytosterols (St-FA), free fatty acids (FFA), tocopherols, free phytosterols (St), and ferulic acid esters of phytosterols (St-F). Moreau et al. reports that the total percentage of oil in normal corn fiber to be as high as 3.33 wt %. Further, Moreau et al. reported approximately 18% (wt/wt) total sterol content (St-FA, St, and St-F) in the extracted oil with 8% as St-FA.

Phytosterols, including beta-sitosterol and its glucoside beta-sitosterolin, closely resemble the molecule cholesterol. These molecules interfere with cholesterol absorption in humans. The lowered absorption of cholesterol from the intestines decreases low density lipoprotein (LDL), which reduces plasma cholesterol levels.

For the purposes of the present invention, phytosterols include, for example but are not limited to, beta-sitosterol, sitostanol, campesterol, campestanol, stigmasterol, stigmastanol, brassicasterol, and other compounds containing the sterol ring system. As used herein, "total sterols" include, for example but not limited to, all of the phytosterols described herein. As used herein, phytosterols also include sterol glucosides, sterol fatty acid esters, and sterol ferulate esters.

The method disclosed in Moreau et al. differs significantly from the present invention in that the extractions described in the present invention are completed on high-solids, thermochemically treated corn fiber. Also, the extractions of the process of the present invention may be carried out on either dry corn fiber or wet, unground corn fiber. The lack of need for completely dry corn fiber is an advantage of the process of the present invention because the energy needed to reduce the fiber from 65% water (typical for mechanically dewatered corn fiber) to 0% unbound water is high. Additionally, grain dust explosions are a potential hazard for grain storage and milling operations. By processing wet, unground corn fiber, the chance of a grain dust explosion is minimized. Concentrations from 0%/100% water/ethanol to 30%/70% water/ethanol of the extractant are used in the process of the present invention to extract the phytosterols. If the water content of the corn fiber after thermochemical treatment is 65%, then 325% of the weight of the total corn fiber stream will need to be added in anhydrous ethanol to achieve an 80%/20% solvent. Therefore, if the amount of water present in the corn fiber can be reduced prior to extraction, the ethanol usage will be greatly decreased.

Ethanol and ethanol/water mixtures are most compatible with current corn wet-milling plants that produce ethanol, since both ethanol and water are available for use in such plants.

SUMMARY OF THE INVENTION

The present invention provides a process for extracting sterols from corn fiber comprising obtaining a corn fiber slurry having a moisture content from about 20 weight percent to 50 weight percent solids (i.e. high solids content), thermochemically processing the corn fiber slurry to produce a hydrolyzed corn fiber slurry, dewatering the hydrolyzed corn fiber slurry to achieve a residual corn fiber having moisture content from about 30 to 80 weight percent solids, washing (at least once) the residual corn fiber with water, dewatering the washed, hydrolyzed corn fiber slurry to achieve a residual corn fiber having a moisture content from about 30 to 80 weight percent solids, and extracting (at least once) the residual corn fiber with ethanol and separating at least one sterol therefrom. In a more preferred embodiment of this process the extracted sterol is a phytosterol that is selected from the group consisting of alpha, beta, and gamma forms of sitosterol, sitostanol, stigmasterol, stigmastanol, campesterol, campestanol, spinasterol, phytosterol esters, phytostanol esters, and mixtures thereof.

In another embodiment of the present invention as described herein, the process includes thermochemically processing the corn fiber slurry by heating the corn fiber slurry from about 130 degrees Centigrade to about 180 degrees Centigrade, and more preferably from about 130 degrees Centigrade to about 190 degrees Centigrade, for at least about one minute, and more preferably from about 2 to 60 minutes.

In yet another embodiment of the present invention the process includes wherein the corn fiber slurry has a moisture content from about 20 to 50 weight percent solids.

In another embodiment of the present invention, the process further includes repeating the extraction of the residual corn fiber at least one time with ethanol.

Another embodiment of the process of the present invention includes carrying out the extraction of the residual corn fiber at a temperature from about 25 degrees Centigrade to 75 degrees Centigrade for at least one minute, and preferably from about 30 to 120 minutes.

In a preferred embodiment of this invention as described herein, the process includes wherein the ethanol/water content on a volume/volume basis is from about 70%/30% to about 100%/0%, and more preferably the ethanol/water content on a volume/volume basis is 95% ethanol and 5% water.

In another embodiment of this invention, the process further includes wherein the thermochemical processing of the corn fiber slurry further includes subjecting the corn fiber slurry to an acid.

DETAILED DESCRIPTION OF THE INVENTION

As used herein, "phytosterols" include, for example but are not limited to, beta-sitosterol, sitostanol, campesterol, campestanol, stigmasterol, stigmastanol, brassicasterol, and other compounds containing the sterol ring system. As used herein, "total sterols" include, for example but not limited to, all of the phytosterols described herein. As used herein, phytosterols also include sterol glucosides, sterol fatty acid esters, and sterol ferulate esters.

One of the key issues in designing an economical process for the hydrolysis of corn fiber is the use and availability of process water. In a plant, process water is both relatively expensive and limited. For example, corn fiber streams dewatered by the Vari-nips presses contains 50-70% water; however, the material has little unabsorbed water. This is because the carbohydrate fractions (starch, hemicellulose, and cellulose) of the corn fiber are able to absorb large amounts of water. One skilled in the art will appreciate that in order to have a material that can be stirred, the moisture content of the slurry needs to be above 80%. The process of the present invention does not require slurrying the material in an aqueous suspension provided that the material is heated in a reactor while being mixed to ensure proper heat transfer. Therefore, in the detailed process of the present invention there is no requirement that the corn fiber be prepared in an aqueous slurry that is stirred and therefore large volumes of water are not necessary.

Another issue directly related to the amount of water contained in the corn fiber slurry is the concentration of monosaccharide sugars that are present in the corn fiber hydrolysate. As the water content increases, the sugar slurry produced becomes more dilute, so that when the hydrolysate is fermented, the ethanol concentration decreases. Below 5% ethanol, it becomes uneconomical to distill the ethanol from the fermentation broth.

Other streams from the plant are often used in place of process water. In another embodiment of the present invention, alternative process streams, such as corn steep liquor and stillage, may be used in preparing the corn fiber slurry. These sources provide water, but they also contain soluble and insoluble solids at levels up to 14% thereby influencing the mixing of corn fiber liquid slurries.

The present invention provides a process for extracting sterols from corn fiber including hydrolysis of corn fiber at high solids contents. As used herein, high solids means a corn fiber slurry having a moisture content from about 20 weight percent to about 50 weight percent solids. The process of this invention includes wherein the corn fiber is taken from the plant at a moisture level between 50-70%, and increasing the moisture level to 50-80%. The corn fiber can be thermochemically hydrolyzed by utilizing a pressure reactor. This type of reactor can be a continuous reactor or a batch reactor. The continuous reactor may utilize screw augers to convey the fiber into the reactor and to keep a pressure seal on the reactor. The batch reactor may be a sealed, rotating reactor. Heating the fiber may be accomplished by injecting steam into the reactor to raise the temperature of the corn fiber to about 130° C., preferably to about 180° C., and more preferably to about 190° C., and preferably from about 138° C. to about 145° C., and more preferably from about 150° C. to about 180° C. The corn fiber is maintained between those temperatures for at least about 1 minute and preferably from about 2 minutes to about 1 hour. The fiber is then removed from the reactor and is then dewatered to remove the oligosaccharide containing liquid.

The high-solids, thermochemical hydrolysis of corn fiber can take place at a range of moisture contents in the slurries from 20 to 50% solids, and a range of temperatures from about 130° C. to about 180° C., and preferably from about 130° C. to about 190° C., for at least about one minute and more preferably from about 2 minutes to about 1 hour. Once the corn fiber is thermochemically hydrolyzed, it is dewatered using a press or filtration device, such as for example but not limited to, a screw press or vacuum filter. The residual fiber after dewatering has a moisture content from about 30% to about 80% solids. This material may then optionally need to be partially dried to reduce the overall ethanol usage as discussed herein.

The fiber is then extracted with at least one, preferably 3, and more preferably 7, volumes of from about 70% to 100% ethanol at a temperature at about 25° C. to about 75° C. for at least about one minute and more preferably from about 10 minutes to about 2 hours. The corn fiber may be, for example, agitated or stirred while being extracted, or it may be extracted with a counter current extractor. After extraction, the ethanol is processed further to separate the oil.

EXAMPLES

Example 1 "Extraction of Non-Thermochemically Treated Corn Fiber Phytosterols with Ethanol" and Example 2 "Extraction of Low-Solids, Thermochemically Treated Corn Fiber Phytosterols with Ethanol" set forth known ethanol extractions of native and thermochemically treated corn fiber at low-solids, respectively. Examples 1 and 2 and the results of phytosterol extractions are described to give a baseline for comparison. Example 3 "Extraction of High-Solids, Thermochemically Treated Corn Fiber with 95% Ethanol" sets forth the process of the present invention.

Example 1

Extraction of Non-Thermochemically Treated Corn Fiber Phytosterols with Ethanol

Corn fiber (49.1 kg total) was mixed with an excess of water and adjusted to pH 5.5 with sodium hydroxide. Genencor Spezyme FRED α-amylase enzyme was added to the corn fiber slurry at double the recommended dosing. The low-solids slurry was treated in a half-moon vat at 60-95° C. for two days (48 hours). The temperature was brought down to 65° C. and Genencor Optidex L-400 amyloglucosidase and Novozymes Fungamyl 800L α-amylase were added at twice the recommended dosage and the slurry was held at 65° C. for 1 day (24 hours). The fiber was dewatered by processing with a screw press and washed and dewatered again 3 times. Portions of the wet, destarched corn fiber were extracted without agitation using ethanol/water (600 mL) in varying ratios (Table 1) at 47° C. for two hours. The ethanol/corn fiber slurry was filtered to remove the corn fiber and the oil-containing ethanol was distilled under reduced pressure to reduce the volume. The residual oil-ethanol mixture was extracted twice with hexane. Saturated sodium chloride solution was added during the extraction to encourage the formation of a distinct boundary between the immiscible solvents. The salt-containing water layer contained significant amounts of precipitate and was discarded without analysis. The hexane layers were combined, decolorized with activated charcoal, dried with magnesium sulfate, and gravity filtered. The hexane was removed via simple distillation under reduced pressure and the resulting samples were desiccated to yield samples 111A, 111C, 111D and 111E in Table 1.

Native corn fiber was divided into 100 g (36.8 g dry weight) portions and extracted without agitation using ethanol/water in varying ratios (Table 1) at 47° C. for two hours. The ethanol/corn fiber slurry was filtered to remove the corn fiber, and the oil-containing ethanol was distilled under reduced pressure to reduce the volume. The residual oil-ethanol mixture was extracted twice with hexane. Saturated sodium chloride solution was added during the extraction to encourage the formation of a distinct boundary between the immiscible solvents. The salt-containing water layer contained significant amounts of precipitate and was discarded without analysis. The hexane layers were combined, decolorized with activated charcoal, dried with magnesium sulfate, and gravity filtered. The hexane was removed via simple distillation under reduced pressure and the resulting samples were desiccated to yield samples 123A, 123B, 123C and 123D in Table 1.

Example 2

Extraction of Low-Solids, Thermochemically Treated Corn Fiber Phytosterols with Ethanol Corn fiber at 13% solids was treated in an agitated reactor at 150° C. for thirty minutes with no acid addition. After 30 minutes the reactor was immediately cooled down to 95° C. and the corn fiber was removed from the reactor. The fiber was then dewatered by filtration under reduced pressure, washed with de-ionized water, and dewatered again. Portions of the wet, thermochemically treated corn fiber were extracted without agitation using ethanol/water (750 mL) in varying ratios (Table 1) at 47° C. for two hours. The first extract was obtained by filtering the corn fiber. A second extraction was completed on the resulting filtercake using the same ethanol/water concentration, time, and temperature as the first extraction. The two ethanol filtrates were combined and the ethanol was reduced via distillation under reduced pressure. When the distillation slowed significantly, the still pot contents were cooled and extracted twice with hexane. Saturated sodium chloride solution was added during the extraction to encourage the formation of a distinct boundary between the immiscible solvents. The salt-containing water layer contained significant amounts of precipitate and was discarded without analysis. The hexane layers were combined, decolorized with activated charcoal, dried with magnesium sulfate, and gravity filtered. The hexane was removed via simple distillation under reduced pressure and the resulting samples were desiccated to yield samples 129A-D in Table 1. The results are consistent with other ethanol/water extractions of corn fiber (Table 1).

Corn fiber at 13% solids (1000 g total) was treated in an agitated reactor at 150° C. for thirty minutes. After 30 minutes, 11.13 mL of 9.12M sodium hydroxide solution was pumped into the reactor to effect a base treatment. After 5 minutes, 3.71 mL of 50% sulfuric acid was added to the reactor to neutralize the reactor contents. The reactor was immediately cooled down to 95° C. and the corn fiber was removed from the reactor. The fiber was then dewatered by filtration under reduced pressure, washed with de-ionized water, and dewatered again. The wet, thermochemically treated corn fiber was extracted without agitation using 70% ethanol/30% water (Table 1) at about 47° C. for about two hours. The first extract was obtained by filtering the corn fiber. A second extraction was completed on the resulting filtercake using the same ethanol/water concentration and temperature as the first extraction for about 1.75 hours. The two ethanol filtrates were combined and the ethanol was reduced via distillation under reduced pressure. When the distillation slowed significantly, the still pot contents were cooled and extracted twice with hexane. Saturated sodium chloride solution was added during the extraction to encourage the formation of a distinct boundary between the immiscible solvents. The salt-containing water layer contained significant amounts of precipitate and was discarded without analysis. The hexane layer was combined, decolorized with activated charcoal, dried with magnesium sulfate, and gravity filtered. The hexane was removed via simple distillation under reduced pressure and the resulting sample was desiccated to yield sample 144 in Table 1. The results are consistent with other ethanol/water extractions of corn fiber (Table 1).

Corn fiber at 13% solids (1077 g total) was pH adjusted to about 5.34 with sodium hydroxide and 2 mL of Genencor Spezyme FRED were added to destarch the corn fiber. The slurry was heated to about 121° C. for about 30 minutes and then 4.4 mL of 50% sulfuric acid was added to effect an acid treatment. After about 5 minutes, 12 mL of 9.12M sodium hydroxide was added to neutralize the slurry and the slurry was cooled and filtered under reduced pressure. Half of the residual corn fiber was extracted with ethanol without agitation using 70% ethanol/30% water (Table 1) at about 47° C. for about two hours. The first extract was obtained by filtering the corn fiber. A second extraction was completed on the resulting filtercake with 70% ethanol/30% water at about 46° C. for about 2.5 hours. The first two ethanol filtrates were combined and the ethanol was reduced via distillation under reduced pressure. When the distillation slowed significantly, the still pot contents were cooled and extracted twice with hexane. Saturated sodium chloride solution was added during the extraction to encourage the formation of a distinct boundary between the immiscible solvents. The salt-containing water layer contained significant amounts of precipitate and was discarded without analysis. The hexane layer was combined, decolorized with activated charcoal, dried with magnesium sulfate, and gravity filtered. The hexane was removed via simple distillation under reduced pressure and the resulting sample was desiccated to yield sample 148 in Table 1. The results are consistent with other ethanol/water extractions of corn fiber (Table 1).

TABLE 1

Evaluation of Ethanol/Water Compositions on Species Extracted from Wet Native Corn Fiber.

| Sample ID | Wet CFH (g); Dry CFH (g) | % (v/v) Water in Ethanol Extraction Solvent[a] | % Material Extracted (wt/wt) | Mass of Samples; final oil wt % based on mass of dry CF | Lipid Components Observed by Thin Layer Chromatography (most abundant to least abundant) |
|---|---|---|---|---|---|
| 111A | —; 35.6 | 5 | — | 300 mg; 0.8% | TAG, FFA, St, St-F, St-FA |
| 111C | 100.0; 35.6 | 15 | — | 320 mg; 0.8% | FFA, TAG, St, St-F, St-FA |
| 111D | 100.0; 35.6 | 20 | — | 160 mg; 0.4% | FFA, TAG, St, St-F, St-FA |
| 111E | 100.0; 35.6 | 25 | — | 160 mg; .4% | FFA, St, St-F, TAG, St-FA |
| 123A | 100.0; 36.8 | 10 | 2.6 | 450 mg; 1.2% | FFA, TAG, St, St-F, St-FA |
| 123B | 100.0; 36.8 | 20 | 1.4 | 200 mg; 0.5% | FFA, TAG, St, St-F, St-FA |
| 123C | 100.0; 36.8 | 25 | 3.6 | 220 mg; 0.5% | FFA, St, St-F, TAG, St-FA |
| 123D | 100.0; 36.8 | 30 | 3.2 | 160 mg; 0.4% | FFA, St, St-F |
| 129A | 200.0; 52 | 15 | 1.5 | 1090 mg; 2.1% | FFA, St, TAG, St-F, St-FA |
| 129B | 200.3; 52.3 | 20 | 0.7 | 590 mg; 1.1% | FFA, St, TAG, St-F, St-FA |
| 129C | 201.3; 52.3 | 25 | 0.9 | 530 mg; 1.0% | FFA, St, TAG, St-F, St-FA |
| 129D | 200.1; 52.1 | 30 | 1.1 | 480 mg; 0.9% | FFA, St, St-F |
| 144 | —; 59.4 | 30 | 12 | 750 mg; 1.3% | FFA, St, TAG, St-F |
| 148 | 347.,3; 126.5 | 30 | 12 | 1160 mg; 0.9% | FFA, St, St-F |

[a]This number included the water present in wet native corn fiber for the initial extraction and was the water content of the re-extraction solvent for the second stage.
TAG = triglycerides;
FA-est = fatty acid esters;
FFA = free fatty acids;
St = phytosterols;
St-F = phytosterols ferulates;
St-FA = phytosterols fatty acid esters.

Example 3

Extraction of High-Solids, Thermochemically Treated Corn Fiber with 95% Ethanol Large-scale experiments have been conducted in a tumbler reactor. A tumbler reactor is a jacketed, 50-gallon pressure tank that uses rotation of the entire reactor for mixing, instead of having a rotating agitator (impeller) inside the tank. By using this method, the solids loading can be higher than the 15%-solids slurry limitation when mixing by a stirrer. The method of hydrolysis is residual $SO_2$-catalyzed hydrolysis of the polysaccharides in the corn fiber, which include starch, hemicellulose and a lesser amount of cellulose. The residual $SO_2$ present in the corn fiber results from the corn steeping process. For Runs #4232-35, 4232-37, 4232-40, and 4232-43, the fiber was placed into a 50-gallon tumbler reactor, and the pressure in the reactor and jacket was increased to approximately 50 to 60 psi, which corresponds to about 138° C. to about 145° C. The reactor was kept at pressure and rotated at 1 rpm for 30 minutes and then depressurized and shut down. The fiber slurry was immediately dewatered either by processing the slurry through a screw press or by filtration under reduced pressure. The fiber residue was then washed twice with an excess of hot water (having a temperature of about 50° C. to about 100° C.) and the wash water was removed by a screw press or by filtration under reduced pressure and collected. The liquid hydrolysate from Run # 4232-43 was collected and subjected to a secondary acid hydrolysis step (1% $H_2SO_4$ at 121° C. for 30 minutes) in an autoclave to hydrolyze the oligosaccharides present in solution to monosaccharides to produce a fermentation feedstock. For the remainder of the runs, a small sample of the hydrolysate was autoclaved at about 121° C. for about 30 minutes with 1% $H_2SO_4$ for analysis purposes. The details of each run are shown in Table 2 and the analytical results are shown in Table 3 below. The "-1" in Table 3 refers to the original filtrate and "-2" refers to the filtrate that has been acid treated to hydrolyze the oligosaccharides to monosaccharides. The pentoses include xylose and arabinose and the hexoses include glucose and galactose.

Run #4232-49 was completed with the same procedure as Runs #4232-35 to -43, but after the initial hydrolysis step, the reactor was depressurized and 300 mL of enzymes were added to the fiber slurry. The enzymes added were 50 mL each of Dyadic International hemicellulases FoodCel Plus, ViscoStar 150L, ViscoStar CL CONC, and Neutral Fungal Cellulase, Genencor International Spezyme FRED α-amylase, and Novozymes Optidex L-400 amyloglucosidase. The reactor was held at about 60° C. for about 48 hours and then the fiber was dewatered and washed twice with dewatering in-between.

Run #4232-52 was completed with the same procedure as Runs #4232-35 to -43, but after the initial hydrolysis step, the reactor was depressurized and 1 weight percent (wt. %) sulfuric acid was added to the fiber slurry. The reactor was brought to about 130° C. and the slurry was hydrolyzed for about 45 minutes. This run was completed to determine if the soluble oligosaccharides generated in the initial hydrolysis could be hydrolyzed to monosaccharides by the acid before the liquid was separated from the solids.

TABLE 2

Tumbler Reactor Run Details.

| Run # | Corn Fiber Dry Weight (kg) | Corn Fiber Slurry Solids Content | Hydrolysis Time (min) | Hydrolysis Temperature (C.) | Solubilization |
|---|---|---|---|---|---|
| 4232-35 | 4.9 | 35% | 30 | 150 | 36% |
| 4232-37 | 4.9 | 35% | 30 | 150 | 40.5% |
| 4232-40 | 4.5 | 30% | 30 | 138 | 40.9% |
| 4232-43 | 4.7 | 30% | 30 | 138 to 150 | 48.1% |
| 4232-49 | 4.9 | 30% | 30 + 2880 | 138 to 150 then 60 | 50.4% |
| 4232-52 | 4.3 | 30% | 45 + 45 | 138 to 150 then 130 | 67.6% |

TABLE 3

Analytical Results for Tumbler Reactor Filtrates (Runs #4232-) (in g/L).

| Run ID 4232 | Protein | Hexoses | Pentoses | Acetic Acid | HMF | Furfural | Coumaric Acid | Ferulic Acid |
|---|---|---|---|---|---|---|---|---|
| 35-1 | 18.7 | 5.4 | 14.8 | 2.5 | 0.04 | 0.04 | 0 | 0.00 |
| 35-2 | 21.8 | 27.7 | 32.4 | 3.3 | 0.32 | 0.94 | 0.05 | 0.06 |
| 37-1 | 18.3 | 5.1 | 15.4 | 2.1 | 0.24 | 0.90 | 0.08 | 0.03 |
| 37-2 | 20.3 | 24.7 | 34.6 | 3.5 | 0.37 | 1.11 | 0.07 | 0.10 |
| 40-1 | 20 | 3.3 | 16.4 | 0.9 | 0 | 0.13 | 0.06 | 0 |
| 40-2 | 24 | 38.1 | 40.8 | 2.5 | 0.02 | 0.23 | 0.04 | 0 |
| 43-2 | 15 | 20.8 | 42.8 | 3.7 | 0.48 | 1.73 | 0 | 0 |
| 49-2 | 14.41 | 62.6 | 89.2 | 11.8 | 2.49 | 9.49 | 2.3 | 0.31 |
| 52-2 | — | 23.6 | 72.5 | 3.2 | 0.39 | 0.16 | 0 | 0 |

The filtrates and two washes from runs #4232-35, 4232-37, and 4232-40 were pooled and concentrated in a small, natural circulation evaporator to a solids concentration of 20% and then subjected to secondary acid hydrolysis by heating at about 130° C. in a tumbler reactor for about 1 hour with 1% w/w sulfuric acid added. The pooled liquid is designated below as Run #4232-45. The sugars, proteins, phenolics, and degradation products are shown in Table 4, the elemental analysis is shown in Table 5, and the amino acids analysis is shown in Table 6. The high levels of sulfur are due to the $SO_2$ present plus the sulfuric acid added during the secondary hydrolysis step for the purpose of completely hydrolyzing the oligosaccharides.

TABLE 4

Analytical Results for Pooled, Concentrated Hydrolysate (in g/L).

| Run ID 4232 | Protein | Hexoses | Pentoses | Acetic Acid | HMF | Furfural | Coumaric Acid | Ferulic Acid |
|---|---|---|---|---|---|---|---|---|
| -45 | 26 | 30.79 | 63.01 | 1.352 | 0.564 | 1.796 | 0.044 | 0.078 |

TABLE 5

Elemental Analysis for Concentrated, Secondary Acid Hydrolyzed Corn Fiber Filtrate (in mg/kg).

| Run # | Ca | Fe | Mg | Na | P | S | K | Cl |
|---|---|---|---|---|---|---|---|---|
| 4232-45 | 116 | 11.8 | 469 | 498 | 1084 | 3369 | 1815 | 364 |

TABLE 6

Amino Acid Analysis Before and After Hydrolysis (in mg/kg).

|  | 4232-45-2 | 4232-45-2 Hydrolyzed |
|---|---|---|
| Aspartic Acid | 639 | 1,300 |
| Threonine | 178 | 863 |
| Serine | 157 | 909 |
| Homoserine | 6 | <5 |
| Glutamic Acid | 48 | 3,442 |
| Proline | 117 | 1,232 |
| Glycine | 126 | 1,147 |
| Alanine | 365 | 1,307 |
| Cystine | <19 | <105 |
| Valine | 216 | 890 |
| Methionine | 96 | 301 |
| Isoleucine | 136 | 557 |
| Leucine | 288 | 1,257 |
| Tyrosine | 157 | 565 |
| Phenylalanine | 205 | 590 |
| Lysine | 256 | 703 |
| Ammonia | 545 | 835 |
| Histidine | 52 | 862 |
| Arginine | 260 | 788 |

For the oil extraction step, the wet fiber residues from Runs #4232-35, -37, -40, -43, -49, and -52 (ranging from about 25% to about 39% dry solids) were loosely packed into an un-agitated 20 L jacketed reactor (having a diameter of about 40.6 centimeters (16 inches) and a height of about 76.2 centimeters (30 inches)), and ethanol (95% ethanol/5% water) was added (in the amount of from about one to five liters) until eluent emerged from the bottom of the reactor. The reactor was held at a set temperature during the extraction (see Table 7). Air was passed downflow through the reactor to force the ethanol through the reactor, and the eluent was collected. The fiber was removed from the reactor and then the eluent was placed in the rector and saponified with KOH (1% weight/volume on samples 4232-35, 4232-37, and 4232-40; 2% weight/volume with samples 4232-43, 4232-49, and 4232-52) for about two hours at about 56° C., 65° C. or 75° C., quenched with acid, and the volume was reduced by evaporation under reduced pressure until foaming halted ethanol removal. The resulting solutions were extracted twice with an equal volume of hexane. The concentrated hexane layers of 4232-40 and 4232-43 were back-extracted with an equal volume of deionized water to examine the impact of a water extraction step on the yield of the final oil samples. Each hexane layer was dried with magnesium sulfate, filtered and distilled, and the resulting oil samples were recovered, weighed and submitted for analysis. It was found that the water layers contained sterols and stanols, so the water back-extraction step was discontinued.

The oil, sterol, and stanol results are given in Tables 7 and 8. Table 8 shows the individual sterols and stanols as a percentage of the extracted oil. Samples 4232-35, -37, -49 and -52 were not back-extracted with water as were samples 4232-40 and 4232-43.

The ethanol (EtOH) extracted corn fiber residues were dried completely and reweighed. The mass losses of the corn fiber due to extraction are given in Table 7 and varied from approximately 8 to 28 percent.

TABLE 7

Summary of Oil Yields and Material Extracted from Kilogram Quantities of Thermochemically Treated Native Corn Fiber.

| Sample | Extraction method; EtOH used | Oil yield (g) | Oil Extracted Weight % of Starting Corn Fiber | Sterol and Stanol Extracted as a Percentage of the Starting Fiber | % wt. lost from fiber during extraction |
|---|---|---|---|---|---|
| 4232-35 | Wet, batch at 56° C.; 95% | 38 | 0.775% | 0.27% | 18 |
| 4232-37 | Wet, batch at 56° C.; 95% | 23.0 | 0.469% | 0.25% | 14 |

TABLE 7-continued

Summary of Oil Yields and Material Extracted from Kilogram Quantities of Thermochemically Treated Native Corn Fiber.

| Sample | Extraction method; EtOH used | Oil yield (g) | Oil Extracted Weight % of Starting Corn Fiber | Sterol and Stanol Extracted as a Percentage of the Starting Fiber | % wt. lost from fiber during extraction |
|---|---|---|---|---|---|
| 4232-40 | Wet, batch at 65° C.; 95% | 13.9[a] | 0.308% | 0.049% | 27 |
| 4232-43 | Wet, batch at 75° C.; 95% | 10.6[a] | 0.217% | 0.093% | 7.8 |
| 4232-49 | Wet, batch at 75° C.; 95% | 115.5 | 2.343% | 0.165% | 28.1 |
| 4232-52 | Wet, batch at 75° C., 95% | 119.5 | 2.758% | 0.166% | 15.2 |

[a]This oil sample was dissolved in the minimum amount of hexane and back-extracted with deionized water three times leaving behind an emulsion of ethyl acetate soluble material in the water layer.

TABLE 8

Sterol Results for Kilogram Extractions of Thermochemically Treated Native Corn Fiber on Extracted Oil Weight % Basis.

| Sample | Cholesterol | Brassicasterol | Campesterol | Campestanol | Stigmasterol | Sitosterol | Sitostanol | Total Sterols |
|---|---|---|---|---|---|---|---|---|
| 4232-35 | 0.43 | 0.03 | 1.84 | 0.51 | 1.87 | 7.88 | 1.89 | 14.45 |
| 4232-37 | 0.42 | 0.10 | 3.14 | 1.47 | 2.57 | 13.00 | 5.07 | 25.76 |
| 4232-40 | — | — | 1.83 | 2.08 | 1.42 | 7.22 | 6.28 | 18.83 |
| 4232-43 | — | — | 6.18 | 4.86 | 3.47 | 25.0 | 15.0 | 54.51 |
| 4232-49 | 0.03 | 0.01 | 1.04 | 1.15 | 0.54 | 4.60 | 4.62 | 12.00 |
| 4232-52 | 0.12 | 0.01 | 0.97 | 1.11 | 0.67 | 4.36 | 4.12 | 11.37 |

Example 4

Extraction of High-Solids, Thermochemically Treated Corn Fiber with 100% Ethanol in a Continuous Countercurrent Extractor Further large-scale experiments have been conducted in a tumbler reactor. The method of hydrolysis is residual $SO_2$-catalyzed hydrolysis of the polysaccharides in the corn fiber, which include starch, hemicellulose and a lesser amount of cellulose. In runs #4232-72-1 through #4232-72-9, the fiber was placed into a 50-gallon tumbler reactor, and the pressure in the reactor and jacket was increased to approximately 60 psi, which corresponds to about 145° C. For each of the nine runs, the reactor was kept at pressure and rotated at 1 rpm for 30 minutes and then depressurized and shut down. The fiber slurry was immediately dewatered by processing the slurry through a screw press. The fiber residue was then washed twice with an excess of hot water (having a temperature of about 50° C. to about 100° C.) and the wash water was removed by a screw press and collected. The liquid hydrolysates and washes from Runs #4232-72-1 through #4232-72-9 were collected and subjected to a secondary acid hydrolysis step (1% $H_2SO_4$ at 121° C. for 30 minutes) in a 50 gallon stirred reactor to hydrolyze the oligosaccharides present in solution to monosaccharides to produce a fermentation feedstock. The details of each run are shown in Table 9.

TABLE 9

Details of Runs #4232-72-1 through #4232-72-9

| Run #4232 | -72-1 | -72-2 | -72-3 | -72-4 | -72-5 | -72-6 | -72-7 | -72-8 | -72-9 |
|---|---|---|---|---|---|---|---|---|---|
| Mass of Initial Fiber | 11.1 | 11.8 | 9.7 | 10.8 | 10.6 | 11.8 | 10.6 | 11.3 | 10.9 |
| Temperature (C.) @ 60 psi | 145 | 145 | 145 | 145 | 145 | 145 | 145 | 145 | 145 |

TABLE 9-continued

Details of Runs #4232-72-1 through #4232-72-9

| Run #4232 | -72-1 | -72-2 | -72-3 | -72-4 | -72-5 | -72-6 | -72-7 | -72-8 | -72-9 |
|---|---|---|---|---|---|---|---|---|---|
| Mass of Hydrolyzed Fiber | 12.2 | 13.3 | 11.8 | 12.5 | 11.9 | 14.0 | 12.5 | 12.5 | 12.2 |
| Mass of Hydrolysate | 4.3 | 4.2 | 5.0 | 5.3 | 4.4 | 4.6 | 4.6 | 3.9 | 3.9 |
| Mass of Wash Water | 13.1 | 15.4 | 15.0 | 14.5 | 13.0 | 13.2 | 14.1 | 13.4 | 14.3 |
| Mass of Fiber Residue | 5.9 | 5.6 | 4.8 | 5.3 | 4.8 | 5.9 | 5.3 | 5.7 | 5.3 |
| Mass of Wash | 14.5 | 15.8 | 15.9 | 14.8 | 13.4 | 14.1 | 14.8 | 14.1 | 16.6 |
| Moisture of Initial Sample | 57.5% | 57.5% | 57.5% | 59.9% | 59.9% | 58.8% | 58.8% | 59.4% | 59.7% |
| Moisture of Hydrolysate | 77.7% | 79.9% | 79.2% | 78.4% | 78.0% | 78.3% | 77.6% | 76.6% | 75.5% |
| Moisture of Wash | 95.7% | 96.9% | 96.7% | 96.1% | 95.8% | 94.9% | 95.2% | 94.7% | 94.5% |
| Moisture of Final Fiber Residue | 58.2% | 55.8% | 57.7% | 60.6% | 57.1% | 54.8% | 56.2% | 59.6% | 61.8% |
| Solubilization | 47.8% | 56.6% | 47.7% | 52.3% | 51.4% | 44.9% | 47.1% | 50.0% | 54.2% |

The pooled, secondary acid hydrolyzed corn fiber hydrolysate was concentrated in a forced circulation, long-tube vertical evaporator to a solids concentration of 31%. The analytical results from the pooled hydrolysate are shown in Table 10 below. The pooled liquid is designated below as Run #4232-72. The high levels of ash are due mainly to the sulfur in the $SO_2$ plus the sulfuric acid added during the secondary hydrolysis step for the purpose of completely hydrolyzing the oligosaccharides. The pentoses include xylose, arabinose and fructose; and the hexoses include glucose, mannose and galactose.

The thermochemically hydrolyzed corn fiber residue from Run #4232-72 (44.8 kg of 56% moisture, 25.09 kg dry weight) was extracted with 99.9% ethanol in a six-stage Crown counter-current extractor. The extractor was operated with ethanol at 150° F. (65.6° C.), a feed rate of 200 mL/min of ethanol, and a chain drag speed of approximately 1.5 inches/min (3.81 cm/min). The fiber was added to the chain drag up to the top of each section as the chain passed the feed opening. 50 gallons (189.2 liters) of ethanol were utilized to extract the fiber. After the fiber was extracted, it immediately entered a desolventizer (DT) where it was heated and agitated with two ribbon mixers to evaporate the ethanol. The ethanol entered a condenser and was pumped back to the last stage of the extractor (where the fresh ethanol entered). The DT was kept at about 140° F. (60° C.) with steam heating and was under reduced pressure, so that the ethanol vapors would enter the condenser. The ethanol from the extractor was collected for further treatment.

The oil-containing ethanol from the extraction was concentrated in a forced circulation, long-tube vertical evaporator with pumps on the inlet and outlet for continuous operation. The 50 gallons (189.2 L) of ethanol used for extraction absorbed the water present in the corn fiber, so the volume was increased to 55 gallons (208.2 L). The evaporator was operated at 1 PSIG (108 kPa) steam pressure, −24 in. Hg (20 kPa), and a liquid temperature of from about 115-120° F. (46-49° C.). The 55 gallons of ethanol/oil extract (208.2 L) were fed into the evaporator and evaporated to a total of 3 gallons (11.4 L). The evaporated ethanol was collected and stored. The concentrated oil extract was fed into a smaller natural circulation evaporator. The 3 gallons (11.4 L) of concentrated oil extract were concentrated to 2.84 kg of oil extract. The concentrations of sterols in the oil extract are shown in Table 11, before and after saponification. The highest concentrations of free phytosterols are Sitosterol and Sitostanol as expected. In the oil compositions shown in Table 12, the prevalent component is Triglycerides followed by Free Fatty Acids. The analysis of the oil was used to determine the percent oil extracted and percent phytosterol extracted. The mass of the oil concentrate extracted from the fiber was 2.42 kg, and the estimated mass of starting native fiber, after processing losses through the screw press and reactor, is 40.6 kg. This gives an oil yield based on the initial mass of dry corn fiber of 4.7% and a phytosterol yield based on the initial mass of dry corn fiber of 0.55%.

TABLE 10

Pooled, Secondary Acid Hydrolyzed Corn Fiber Hydrolysate Concentrate for Run #4232-72

| Run ID | Protein | Hexoses | Pentoses | Acetic | HMF | Furfural | Ash | Total Organic Carbon |
|---|---|---|---|---|---|---|---|---|
| 4232-72 | 32.5 | 67 | 103 | 4.4 | 0.4 | 0.05 | 16.8 | 132 |

TABLE 11

Sterol Concentrations in Corn Fiber Oil Sample (g/L)

| | 4232-172 Oil Extract after saponification | 4232-172 Oil Extract |
|---|---|---|
| Campesterol | 8.49 | 4.23 |
| Campestanol | 8.53 | 1.34 |
| Stigmasterol | 4.87 | 4.34 |
| Sitosterol | 32.34 | 18.85 |
| Sitostanol | 24.88 | 4.16 |
| Total Sterols | 79.11 | 32.92 |

TABLE 12

Oil Component Concentrations (g/L)

| Sample Id | 4232-172 Oil Extract |
|---|---|
| Total Free Fatty Acids | 118.9 |
| Total Monglycerides | 3.7 |
| Total Diglycerides | 16.0 |
| Total Triglycerides | 457.9 |

The above Examples 1 and 2 describe extractions of corn fiber that has not been treated, or treated by enzymes. Example 2 describes the thermochemical treatment of corn fiber at low-solids levels with extraction of phytosterols. The low-solids thermochemical treatment leads to a fermentation liquid with low sugar concentrations, which would result in low product concentrations after fermentation or catalysis. For ethanol specifically, the final fermentation broth ethanol concentration needs to be above 5% for economic recovery by distillation. The corn fiber hydrolysate can be extensively concentrated by evaporating the water before fermentation, however, this also requires a large energy input. In the process of the present invention, the corn fiber is thermochemically treated with heat and optionally, acid, at temperatures from about 130° C. to about 190° C. for at least one minute, and preferably for about 2 minutes to 1 hour, at a solids level of about 20% to about 50%. This treatment decreases the volume of the corn fiber and, therefore, the volume of ethanol needed for extraction of the oil without decreasing the yield or altering the composition of the oil.

The present invention discloses a process for thermochemically treating a high-solids slurry of corn fiber and then extracting the residual corn fiber with ethanol to separate the phytosterols. The examples set forth herein show corn fiber slurries with moisture contents of 50-80% can be treated to solubilize starch and hemicellulose to a varying degree. Also, the use of ethanol as an extractant in batch, semi-batch or continuous mode is illustrated by the above examples.

Whereas particular embodiments of this invention have been described for purposes of illustration, it will be evident to those persons skilled in the art that numerous variations of the details of the present invention may be made without departing from the invention as defined in the appended claims.

What is claimed is:

1. A process for extracting sterols from corn fiber comprising:
   obtaining a corn fiber having a moisture content from about 20 weight percent to 50 weight percent solids;
   thermochemically processing said corn fiber at a solids level of 20 to 50 weight percent solids to produce a hydrolyzed corn fiber, wherein said thermochemical processing includes heating said corn fiber from about 130 degrees Centigrade to about 190 degrees Centigrade for at least one minute;
   dewatering said hydrolyzed corn fiber to achieve a residual corn fiber having moisture content from about 30 to 80 weight percent solids;
   washing said residual corn fiber;
   dewatering said washed, hydrolyzed corn fiber to achieve a residual corn fiber having a moisture content from about 30 to 80 weight percent solids; and
   extracting said residual corn fiber with ethanol and separating at least one sterol.

2. The process of claim 1 including wherein said corn fiber has a moisture content of 35 weight percent solids during said thermochemical processing.

3. The process of claim 1 including wherein said sterol is a phytosterol.

4. The process of claim 3 including wherein said phytosterols are selected from the group consisting of sitosterol, sitostanol, stigmasterol, stigmastanol, campesterol, campestanol, spinasterol, phytosterol esters, phytostanol esters, and mixtures thereof.

5. The process of claim 3 including wherein the yield of total phytosterols extracted from the corn fiber ranges from about 0.1 to 1% based on the initial dry mass of corn fiber.

6. The process of claim 3 including wherein the yield of total phytosterols extracted from the corn fiber ranges from about 0.25 to 0.6% based on the initial dry mass of corn fiber.

7. The process of claim 1 including repeating said extracting of said residual corn fiber at least one time with said ethanol.

8. The process of claim 1 including wherein said extracting of said residual corn fiber is carried out at a temperature from about 25 degrees Centigrade to 75 degrees Centigrade for at least one minute.

9. The process of claim 1 including wherein said thermochemically processing is carried out from about 2 minutes to about 60 minutes.

10. The process of claim 1 including wherein the ethanol/water content on a volume/volume basis is from about 70%/30% to about 100%/0%.

11. The process of claim 10 including wherein said ethanol/water content on a volume/volume basis is 95% ethanol and 5% water.

12. The process of claim 1 including wherein said thermochemical processing of said corn fiber further includes subjecting said corn fiber to an acid.

13. The process of claim 1, wherein said thermochemical processing step is accomplished without stirring said corn fiber.

* * * * *